(12) United States Patent
Okazaki (10) Patent No.: US 9,729,747 B2
(45) Date of Patent: Aug. 8, 2017

(54) INFORMATION PROCESSING DEVICE, AND METHOD FOR INSTRUCTING JOB TO IMAGE PROCESSING APPARATUS

(71) Applicant: KYOCERA Document Solutions Inc., Osaka-shi, Osaka (JP)

(72) Inventor: Yusuke Okazaki, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/139,279

(22) Filed: Apr. 26, 2016

(65) Prior Publication Data

US 2016/0323473 A1 Nov. 3, 2016

(30) Foreign Application Priority Data

Apr. 28, 2015 (JP) ................................. 2015-091074

(51) Int. Cl.
*G06F 3/12* (2006.01)
*H04N 1/00* (2006.01)
(Continued)

(52) U.S. Cl.
CPC ....... *H04N 1/00962* (2013.01); *G02B 27/017* (2013.01); *G02B 27/0172* (2013.01); *G06F 3/013* (2013.01); *G06F 3/017* (2013.01); *G06K 9/00671* (2013.01); *H04N 1/00246* (2013.01); *H04N 1/00251* (2013.01); *H04N 1/00408* (2013.01); *G02B 2027/014* (2013.01); *G02B 2027/0138* (2013.01);
(Continued)

(58) Field of Classification Search
None
See application file for complete search history.

(56) References Cited

U.S. PATENT DOCUMENTS 9,096,920 B1 * 8/2015 Gomez .................... C23C 4/06
2013/0307771 A1 11/2013 Parker et al.
(Continued)

FOREIGN PATENT DOCUMENTS

JP 2012216123 A 11/2012

OTHER PUBLICATIONS

European Patent Office, Extended European Search Report Issued in Application No. 16166178.0, Aug. 24, 2016, Germany, 13 pages.

*Primary Examiner* — Henok A Shiferaw
(74) *Attorney, Agent, or Firm* — Alleman Hall Creasman & Tuttle LLP (57) ABSTRACT

When a first recognition condition is satisfied, a target apparatus notification portion causes an image display portion to display a notification notifying that a target apparatus is recognized which exists at an azimuth of a line of sight of a user. The first recognition condition is that an apparatus image exists in a position corresponding to the line-of-sight direction in a field-of-view image taken by a camera, when a line-of-sight direction enters a gaze state under a situation that an image processing apparatus exists in an area where the wireless communication can be performed. An instruction screen control portion causes the image display portion to display an instruction screen for execution of a job, when a second recognition condition is satisfied. The second recognition condition is that the apparatus image exists in the field-of-view image within a short distance range of the target apparatus.

8 Claims, 8 Drawing Sheets

(51) Int. Cl.
*G06F 3/01* (2006.01)
*G02B 27/01* (2006.01)
*G06K 9/00* (2006.01)

(52) U.S. Cl.
CPC ........... *G02B 2027/0178* (2013.01); *G02B 2027/0187* (2013.01); *H04N 2201/0055* (2013.01); *H04N 2201/0094* (2013.01)

(56) References Cited

U.S. PATENT DOCUMENTS

| | | | |
|---|---|---|---|
| 2014/0126018 A1* | 5/2014 | Sugimoto | G06F 3/013 358/1.15 |
| 2015/0269782 A1* | 9/2015 | Tamura | G06T 19/006 345/633 |

* cited by examiner

INFORMATION PROCESSING DEVICE, AND METHOD FOR INSTRUCTING JOB TO IMAGE PROCESSING APPARATUS

INCORPORATION BY REFERENCE

This application is based upon and claims the benefit of priority from the corresponding Japanese Patent Application No. 2015-091074 filed on Apr. 28, 2015, the entire contents of which are incorporated herein by reference.

BACKGROUND

The present disclosure relates to an information processing device worn by a user of an image processing apparatus, and a method for instructing a job to the image processing apparatus.

Generally, a head-mounted device which is an information processing device wearable by a user has been known. A spectacles-type head-mounted device may include an image display portion and a line-of-sight detection portion. The image display portion is supported in front of the eyes of the user, and causes the user to visually recognize an image. The line-of-sight detection portion detects the direction of the line of sight of the user. Further, the head-mounted device may include a camera for taking an image of the field of view of the user.

SUMMARY

An information processing device according to one aspect of the present disclosure is wearable by a user of an image processing apparatus, and includes a camera, an azimuth detection portion, a line-of-sight detection portion, an image display portion, a wireless communication portion, a self-device measurement portion, an installation position obtaining portion, a first apparatus recognition portion, a target apparatus notification portion, a short distance determination portion, a second apparatus recognition portion, an instruction screen control portion, and a job instruction portion. The camera takes an image of a field of view of the user. The azimuth detection portion detects an azimuth at which the information processing device faces. The line-of-sight detection portion detects a line-of-sight direction of the user. The image display portion causes the user to visually recognize an image. The wireless communication portion performs wireless communication with another device. The self-device measurement portion measures a position of the information processing device. The installation position obtaining portion obtains installation position information indicating a position of the image processing apparatus. The first apparatus recognition portion determines whether or not a first recognition condition is satisfied. The first recognition condition is a condition that an apparatus image expressing the image processing apparatus exists in a position corresponding to the line-of-sight direction in a field-of-view image taken by the camera, in a case where the line-of-sight direction enters a predetermined gaze state under a situation that the image processing apparatus exists in an area where the wireless communication can be performed. The target apparatus notification portion, in a case where the first recognition condition is satisfied, causes the image display portion to display a notification notifying that a target apparatus is recognized which is the image processing apparatus existing at an azimuth of the line of sight of the user, which azimuth is specified based on the azimuth at which the information processing device faces and the line-of-sight direction. The short distance determination portion determines whether or not the position of the information processing device is within a short distance range which is previously determined with respect to the position of the target apparatus. The second apparatus recognition portion determines whether or not a second recognition condition is satisfied. The second recognition condition is a condition that the apparatus image exists in the position corresponding to the line-of-sight direction in the field-of-view image, in a case where the line-of-sight direction enters the gaze state under a situation that the position of the information processing device is within the short distance range with respect to the position of the target apparatus. The instruction screen control portion, in a case where the second recognition condition is satisfied, causes the image display portion to display an instruction screen for instructing the target apparatus to execute a job regarding image processing. The job instruction portion transmits instruction information according to the position of the line-of-sight direction on the instruction screen, to the target apparatus through the wireless communication.

A method for instructing a job to an image processing apparatus according to another aspect of the present disclosure is a method using an information processing device including the camera, the azimuth detection portion, the line-of-sight detection portion, the image display portion, the wireless communication portion, and the self-device measurement portion. The job instruction method includes the following steps. In a first step, the information processing device obtains installation position information indicating a position of the image processing apparatus. In a second step, the information processing device determines whether or not the first recognition condition is satisfied. In a third step, in a case where the first recognition condition is satisfied, the information processing device causes the image display portion to display a notification notifying that the target apparatus is recognized. In a fourth step, the information processing device determines whether or not the position of the information processing device is within a short distance range which has previously been determined with respect to the position of the target apparatus. In a fifth step, the information processing device determines whether or not the second recognition condition is satisfied. In a sixth step, in a case where the second recognition condition is satisfied, the information processing device causes the image display portion to display an instruction screen for instructing the target apparatus to execute a job regarding image processing. In a seventh step, the information processing device transmits instruction information according to the position of the line-of-sight direction on the instruction screen, to the target apparatus through the wireless communication.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the accompanying drawings. It should be noted that the following embodiments are examples embodying the present disclosure, and, by nature, do not limit the technical scope of the present disclosure.

[Image Processing Apparatus 10]

First, the configuration of an image processing apparatus 10 communicable with a head-mounted device 1 according to an embodiment will be described with reference to FIG. 1. The image processing apparatus 10 is an apparatus which forms an image on a sheet material 901 as an image recording medium.

Figure 1:
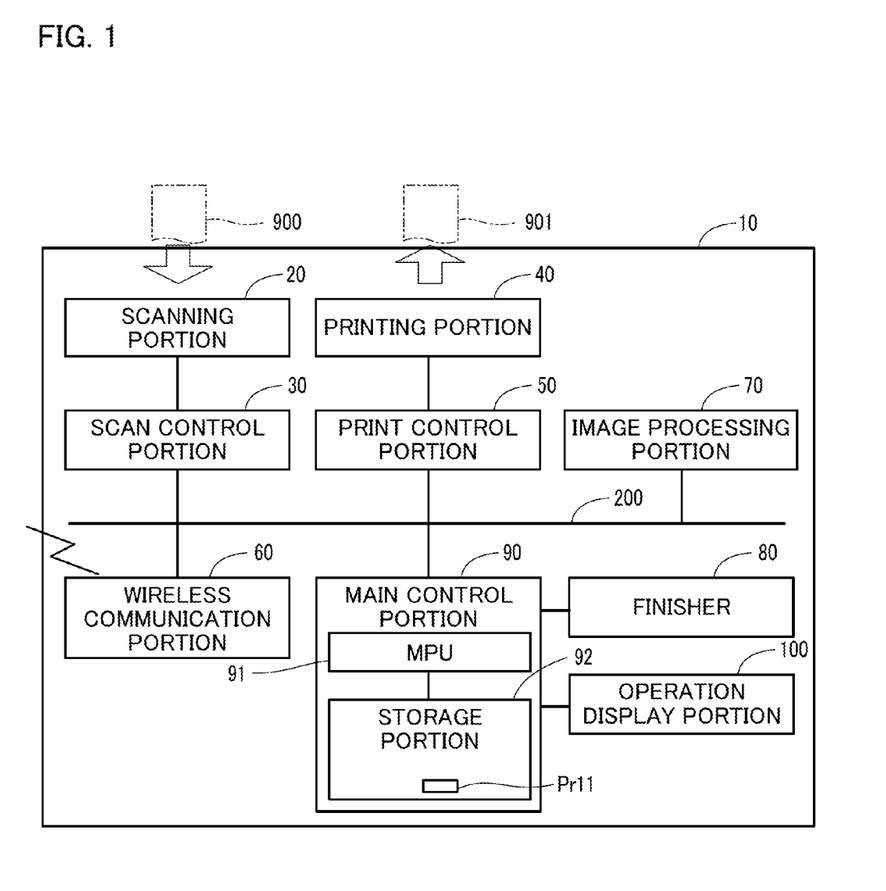
FIG. 1 is a block diagram showing an image processing apparatus.

The image processing apparatus 10 shown in FIG. 1 is a multifunction peripheral having both of the function of an image reading device which reads an image from a document sheet 900 and the function of an image forming device which forms an image on the sheet material 901. It is also conceivable that the image processing apparatus 10 is a facsimile machine having a scanner or an image transmission function. In FIG. 1, the document sheet 900 and the sheet material 901 are indicated by an imaginary line (alternate long and two short dashes line).

The image processing apparatus 10 includes a main control portion 90, an operation display portion 100, a scanning portion 20, a scan control portion 30, a printing portion 40, a print control portion 50, a wireless communication portion 60, an image processing portion 70, and a finisher 80.

The image processing apparatus 10 further includes a lamp 101 which makes identification of the external appearance of the apparatus easy. For example, it is conceivable that the lamp 101 is one or a plurality of LEDs mounted to an exterior part of the image processing apparatus 10. The role of the lamp 101 will be described later.

The main control portion 90, the scan control portion 30, the print control portion 50, the wireless communication portion 60, and the image processing portion 70 are each connected to a bus 200, and can exchange data with one another through the bus 200.

The scanning portion 20 includes: an optical system not shown which scans the document sheet 900 with light; an image sensor not shown which detects, for each pixel, the amount of light reflected from the document sheet 900 and outputs document sheet image data; and the like.

The scan control portion 30 controls the scanning portion 20 and obtains the document sheet image data. Further, the scan control portion 30 transfers, through the bus 200, the document sheet image data to other devices such as the image processing portion 70.

The printing portion 40 forms an image on the sheet material 901 through image forming processing according to well-known electrophotography. The printing portion 40 includes an image carrier not shown and peripheral devices therefor, transfers an image of a developer from the image carrier to the sheet material 901, and fixes the image on the sheet material 901.

The print control portion 50 obtains recording image data from the image processing portion 70, and causes the printing portion 40 to execute a process of forming an image based on the recording image data onto the sheet material 901.

The wireless communication portion 60, by means of radio signals, transmits/receives data to/from external devices such as another image processing apparatus 10, a personal computer not shown, and a head-mounted device 1 described later. For example, the wireless communication portion 60 performs wireless communication such as Wi-Fi® communication or Bluetooth® communication.

Further, the wireless communication portion 60 exchanges data with other devices through the bus 200. For example, the wireless communication portion 60 receives job data for image formation from the external device, and transfers the job data to the image processing portion 70 through the bus 200.

The wireless communication portion 60 also has a function of obtaining the document sheet image data from the scan control portion 30 via the image processing portion 70, and transmitting data including the document sheet image data to the external device. The wireless communication portion 60 further has a function of obtaining information about setting conditions relating to image formation from the head-mounted device 1, and transferring the information to the main control portion 90.

The image processing portion 70 executes various types of data processing onto image data and the like obtained from other devices through the bus 200. The target of data processing performed by the image processing portion 70 is, for example, the document sheet image data obtained from the scan control portion 30, the job data obtained from the external device through the wireless communication portion 60, or the like.

For example, the image processing portion 70 performs image processing such as image rotation processing, halftone processing, or size cut processing, onto the document sheet image data obtained from the scan control portion 30. The image processing portion 70 also executes, for example, a process of converting the document sheet image data obtained from the scan control portion 30 and the job data obtained from the wireless communication portion 60 into the recording image data, and transferring the recording image data to the print control portion 50.

The scan control portion 30, the print control portion 50, and the image processing portion 70 are each composed of a digital signal processor (DSP) or an application specific integrated circuit (ASIC), for example.

The finisher 80 is a device which executes various types of processing relating to the sheet material 901 on which the image has been formed, in accordance with a control command from the main control portion 90. For example, the finisher 80 has various functions such as binding, punching, and sheet shift.

The binding is a process of binding a plurality of the sheet materials 901 on which images have been formed, by striking of a staple or by crimping. The punching is a process of forming a hole penetrating the sheet materials 901. The sheet shift is a function of discharging the sheet materials 901 on which images have been formed and which are sequentially fed from a main body portion of the image processing apparatus 10 to a discharge sheet tray in such a manner that bundles each consisting of a predetermined number of the sheet materials 901 are shifted in position.

The operation display portion 100 includes an operation portion for information input which includes, for example, a touch panel, operation buttons, and the like, and a display portion including a liquid crystal display panel, a notification lamp, and the like.

Figure 2:
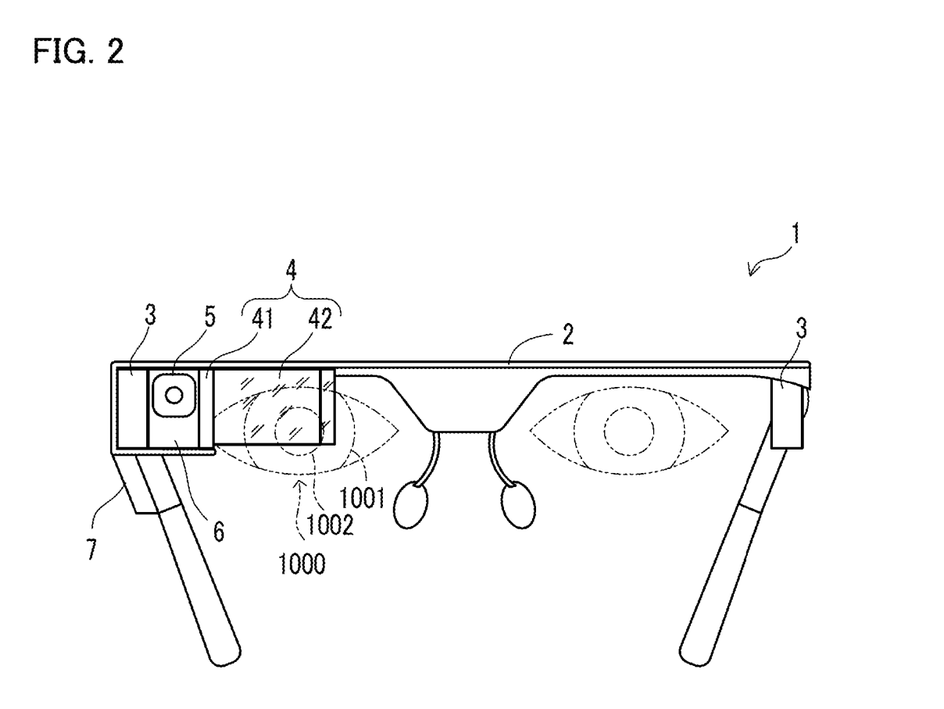
FIG. 2 is a configuration diagram showing a head-mounted device according to an embodiment.

The main control portion 90 performs comprehensive control over other control portions. For example, the main control portion 90 causes the operation display portion 100 to display an operation menu and the like. Further, the main control portion 90 outputs a control command to the other control portions, in accordance with input information inputted through an operation performed on the operation display portion 100, and detection results of various sensors. As shown in FIG. 2, the main control portion 90 includes a microprocessor unit (MPU) 11, a storage portion 92, and the like.

The MPU 91 is a processor which executes various types of calculation and data processing. The storage portion 92 is a non-volatile storage portion in which various types of information referred to by the MPU 91 are stored. The storage portion 92 is also a storage portion from/into which the MPU 91 can read/write various types of information.

In the storage portion 92, programs for causing the MPU 91 to execute various types of processes, information referred to by the MPU 91 executing the programs, and information written by the MPU 91 executing the programs are stored. The main control portion 90 also includes a volatile storage portion not shown, such as a RAM, in which programs to be executed by the MPU 91 are temporarily stored.

[Head-Mounted Device 1]

Next, with reference to FIGS. 2 and 3, the configuration of the head-mounted device 1 according to a first embodiment will be described. The head-mounted device 1 is an example of an information processing device which is wearable by a user of the image processing apparatus 10.

The head-mounted device 1 includes a support member 2, a line-of-sight detection portion 3, an image display portion 4, a camera 5, a main calculation portion 6, an operation portion 7, and the like. The image display portion 4 includes an image projection portion 41 and a prism 42. The head-mounted device 1 also includes a battery which supplies power to electronic equipment included in the head-mounted device 1, and other equipment not shown.

The support member 2 is a member supporting other components of the head-mounted device 1. The support member 2 is a spectacle-frame-shaped member fitted to the face of the user. The support member 2 is supported by the nose and ears of the user.

The camera 5 is fixed to the support member 2 at a position where the camera 5 does not obstruct the field of view of the user wearing the head-mounted device 1. The camera 5 is fixed to the support member 2 so as to face the direction of the field of view of the user. The camera 5 is a field-of-view camera which takes an image of the field of view of the user. In the following description, the image taken by the camera 5 is referred to as a field-of-view image.

The line-of-sight detection portion 3 is a sensor which detects the direction of the line of sight of the user. The line-of-sight direction detected by the line-of-sight detection portion 3 is a relative direction based on the direction of the head-mounted device 1, and is not an absolute direction based on the earth. In the example shown in FIG. 2, a pair of line-of-sight detection portions 3 are fixed to the support member 2 at positions outside both eyeballs 1001 of the user, respectively.

A retina and a cornea of each eyeball 1001 are charged at different polarities. The direction of an electric field generated from the retina toward the cornea depends on the line-of-sight direction of the user. The line-of-sight detection portion 3 detects the direction of the electric field generated in the eyeball 1001 to detect the line-of-sight direction of the user.

It is also conceivable that the line-of-sight detection portion 3 includes a line-of-sight detection camera and an image processing portion. In this case, the line-of-sight detection camera sequentially takes images of the eyeball 1001 of the user. The image processing portion detects the position of a pupil 1002 from the images of the eyeball 1001 to detect the line-of-sight direction of the user.

The image display portion 4 is a unit which is supported in front of eyes 1000 of the user, and causes the user to visually recognize an image. The image display portion 4 according to the present embodiment causes the user to visually recognize an image by means of retinal projection.

In the image display portion 4, the image projection portion 41 is fixed to the support member 2 at a position outside the field of view of the user. The transparent prism 42 is fixed to the support member 2 at a position inside the field of view of the user.

The image projection portion 41 projects light of an image to the prism 42. The prism 42 reflects the projected light of the image into the retina of the eye 1000 of the user. In this case, the user looks forward through the prism 42, whereby the user visually recognizes an image in which the image projected by the image projection portion 41 is superimposed on an actual image in the field of view. That is, a display area of the image on the image display portion 4 is an area overlapping the field of view of the user.

In the head-mounted device 1, a predetermined calibration is performed in advance, whereby the image display portion 4 obtains coordinate correspondence information representing the correspondence relationship between the line-of-sight direction of the user detected by the line-of-sight detection portion 3 and a position in the display area of the image display portion 4.

Based on the coordinate correspondence information, the image display portion 4 can display an arbitrary projected image at a position corresponding to the line-of-sight direction of the user in the display area of the image display portion 4.

For example, the image display portion 4 can display, in the display area, a cursor image which moves to a position corresponding to the line-of-sight direction of the user which is sequentially detected by the line-of-sight detection portion 3.

When the image display portion 4 displays an image in a certain position in the field of view of the user, the image display portion 4 can determine, based on the coordinate correspondence information, whether or not the line of sight of the user faces the display image.

The operation portion 7 is a portion on which information is inputted according to an operation manually performed by the user. For example, it is conceivable that the operation portion 7 includes either or both of a touch pad and operation buttons.

The main calculation portion 6 obtains the information inputted through the operation portion 7 and data of the field-of-view image obtained by the camera 5, and performs various types of calculation. Further, the main calculation portion 6 controls the camera 5 and the image display portion 4.

Figure 3:
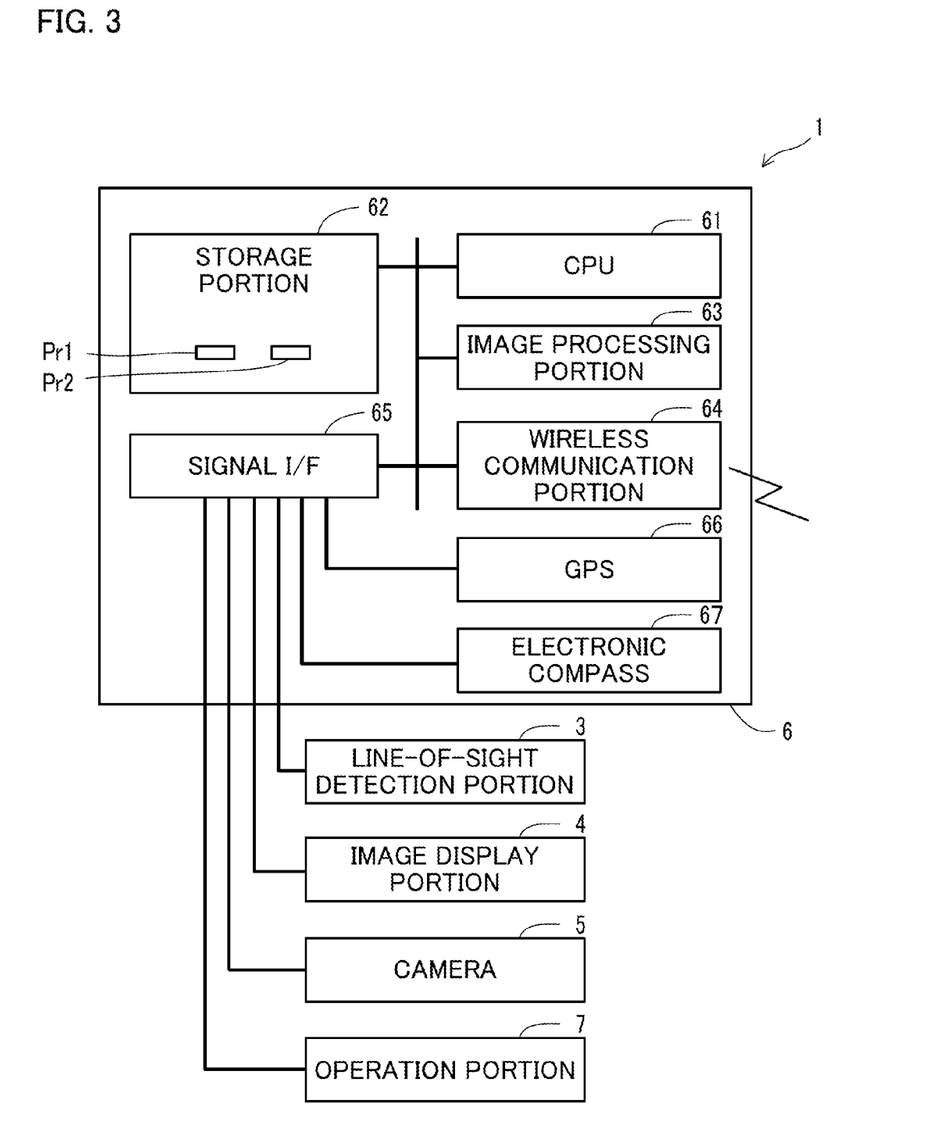
FIG. 3 is a block diagram showing a data processing relevant portion of the head-mounted device according to the embodiment.

As shown in FIG. 3, the main calculation portion 6 includes a central processing unit (CPU) 61, a storage portion 62, an image processing portion 63, a wireless communication portion 64, a signal interface 65, a global positioning system (GPS) element 66, an electronic compass 67, and the like.

The CPU 61 is a processor which executes various types of calculation and data processing. The storage portion 62 is a non-volatile storage portion in which various types of information referred to by the CPU 61 are stored. The storage portion 62 is also a storage portion from/into which the CPU 61 can read/write various types of information.

In the storage portion 62, programs for causing the CPU 61 to execute various types of processes, information referred to by the CPU 61 executing the programs, and information written by the CPU 61 executing the programs are stored. The main calculation portion 6 also includes a volatile storage portion not shown, such as a RAM, in which programs executed by the CPU 61 are temporarily stored.

The image processing portion 63 is a calculation portion which performs various types of image processing onto the data of the field-of-view image obtained by the camera 5. The image processing portion 63 is composed of a DSP or an ASIC, for example.

The wireless communication portion 64 transmits/receives data to/from another apparatus such as the image processing apparatus 10 through wireless communication. Further, the wireless communication portion 64 exchanges transmission data and reception data with the CPU 61. For example, the wireless communication portion 64 performs wireless communication such as Wi-Fi communication.

The GPS element 66 is a sensor which measures the position of the head-mounted device 1. The electronic compass 67 is an azimuth sensor which detects an azimuth at which the head-mounted device 1 faces. For example, the electronic compass 67 detects an azimuth of the axial direction of the camera 5. The GPS element 66 and the electronic compass 67 are examples of a self-device measurement portion and an azimuth detection portion, respectively.

The signal interface 65 relays exchange of data between the CPU 61 and each of the GPS element 66, the electronic compass 67, the line-of-sight detection portion 3, the image display portion 4, the camera 5, and the operation portion 7. Further, the signal interface 65 relays transfer of data of the field-of-view image from the camera 5 to the image processing portion 63.

By the way, in the image processing apparatus 10 such as a printer, scanner, a copying machine, a facsimile machine, or the like, it is desired that the user can easily instruct the apparatus to execute a job regarding image processing, in order to improve operability.

For example, when the user wants to use an image processing apparatus 10 located in a facility, such as a library, which is not related to an affiliation the user belongs to, the user has no idea about the location, functions, and the like of each of a plurality of image processing apparatuses 10 located in a local area network (LAN). Under such environment of use, it is desired that the user can easily instruct the image processing apparatus 10 to execute the job.

When the head-mounted device 1 is adopted, the user of the image processing apparatus 10 can easily instruct the image processing apparatus 10 to execute the job regarding image processing.

The head-mounted device 1 executes a target apparatus designating process and a job instructing process described below, in order to facilitate the instruction to execute the job regarding image processing, to the image processing apparatus 10. The job instructing process is executed subsequently to the target apparatus designating process. The target apparatus designating process and the job instructing process are processes that realize an example of a method for instructing a job to the image processing apparatus 10 by using the head-mounted device 1.

[Target Apparatus Designating Process]

Next, with reference to a flowchart shown in FIG. 4, an example of a procedure of the target apparatus designating process performed in the head-mounted device 1 will be described.

The target apparatus designating process is a process in which the head-mounted device 1 designates, as a target apparatus, an image processing apparatus 10 located in a distant place, in accordance with an operation based on the line of sight of the user. The target apparatus is the image processing apparatus 10 to be used by the user.

Figure 4:
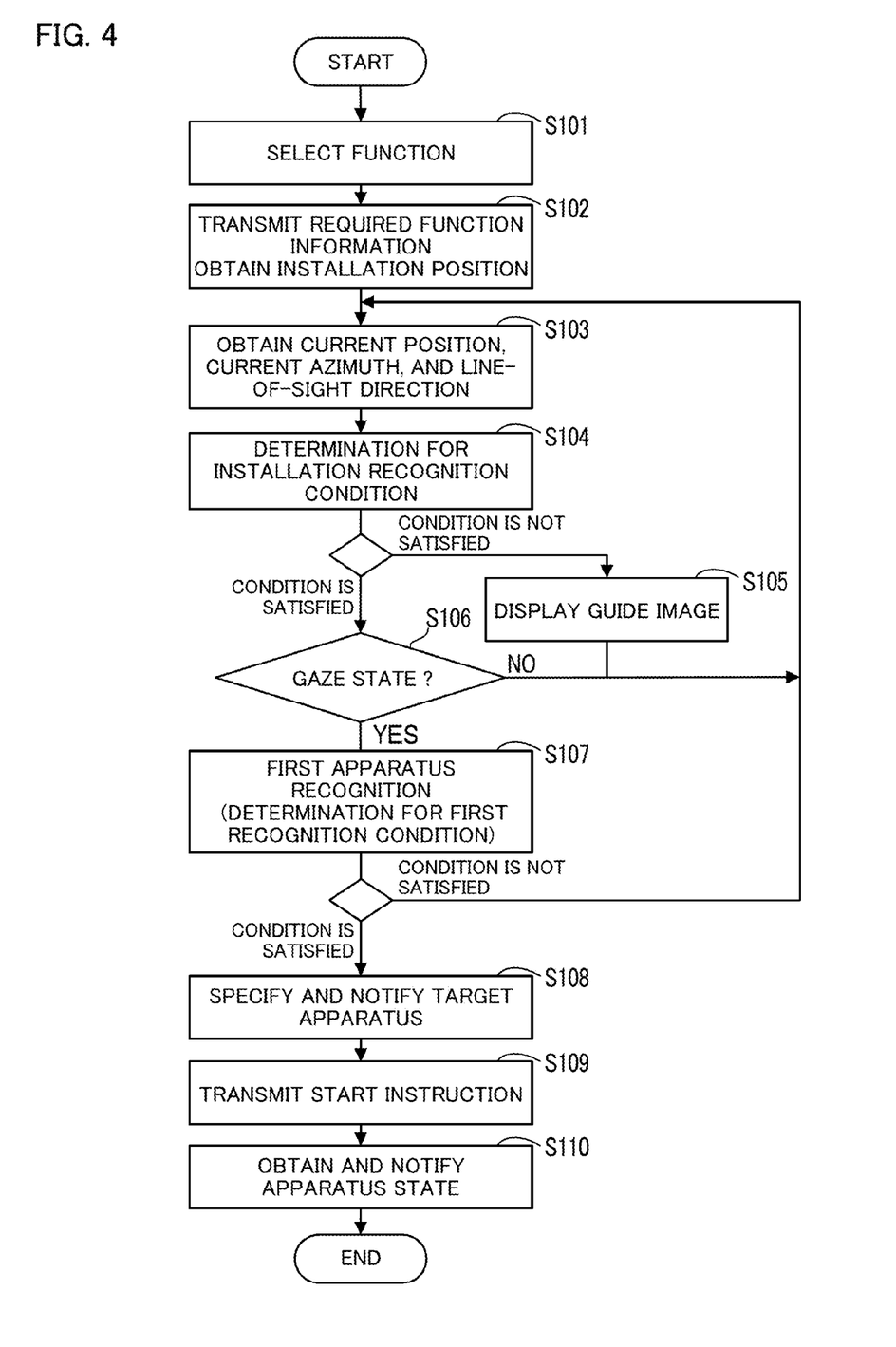
FIG. 4 is a flowchart showing an example of a procedure of a target apparatus designating process in the head-mounted device according to the embodiment.

The target apparatus designating process shown in FIG. 4 is started when a predetermined start event takes place. An example of the start event is a predetermined start operation performed to the operation portion 7 of the head-mounted device 1 after connection for wireless communication has been established between the head-mounted device 1 and the image processing apparatus 10.

In the following description, S101, S102, . . . each represents an identification character of a step executed by the main calculation portion 6. When the CPU 61 executes a target apparatus designating program Pr1 stored in the storage portion 62, the main calculation portion 6 executes the target apparatus designating process.

<Step S101>

When the start event takes place, the CPU 61 of the main calculation portion 6 executes a function selecting process. The function selecting process is a process of selecting, in accordance with the line-of-sight direction, a function required for execution of a job regarding image processing planned by the user.

Figure 6:
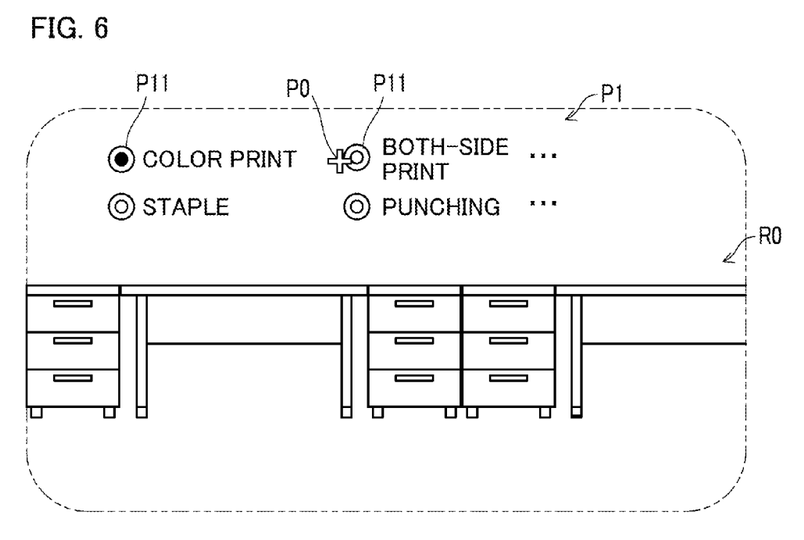
FIG. 6 is a diagram showing an example of an image of the field of view of a user, including a required function selection screen projected by the head-mounted device according to the embodiment.

In the function selecting process, the CPU 61 causes the image display portion 4 to display a function selection screen P1 as shown in FIG. 6, for example. The function selection screen is a screen for selection of the function required for execution of the job regarding image processing. Further, the CPU 61 selects the function required for execution of the job, in accordance with a position corresponding to the line-of-sight direction on the function selection screen P1.

As shown in FIG. 6, the function selection screen P1 is a screen showing a selection menu of functions regarding image processing, such as color printing, both-side printing, stapling, punching, and the like. The function selection screen P1 includes line-of-sight operation portions P11 such as check boxes for checking whether to select each function.

In the present embodiment, when the line-of-sight direction enters a predetermined gaze state toward the position of a certain line-of-sight operation portion P11, the function corresponding to the line-of-sight operation portion P11 is selected. The gaze state is a state in which the line-of-sight direction is maintained within a predetermined narrow range for a predetermined set gaze time.

The function selection screen P1 is superimposed on an actual image R0 and visually recognized by the user. The actual image R0 is an image of actual objects existing in the field of view of the user. The CPU 61 executing the process in step S101 is an example of a function selecting portion.

<Step S102>

Next, the CPU 61 of the main calculation portion 6 transmits required function information containing information about the function required for execution of the job selected in step S101, to each image processing apparatus 10 through wireless communication via the wireless communication portion 64.

Further, in step S102, the CPU 61 obtains information about the installation position of each image processing apparatus 10, which is returned from the image processing apparatus 10 in response to the transmitted required function information. That is, the CPU 61 obtains the information about the installation position, from each image processing apparatus 10 through wireless communication via the wireless communication portion 64. The CPU 61 executing the process in step S102 is an example of a required function information transmission portion and an installation position obtaining portion.

In the present embodiment, the required function information transmitted from the CPU 61 also serves as a request command for the information about the installation position to each image processing apparatus 10. Each image processing apparatus 10 returns the information about the installation position of the image processing apparatus 10 only when the image processing apparatus 10 has the function indicated by the received required function information. Accordingly, the information about the installation position obtained by the CPU 61 is information about the position of the image processing apparatus 10 which has all the required functions indicated by the required function information.

For example, in the image processing apparatus 10, the MPU 91 of the main control portion 90 executes a response program Pr11 stored in the storage portion 92. Thereby, the main control portion 90, when receiving the required function information, determines whether or not the image processing apparatus 10 has the function indicated by the required function information. Further, when the image processing apparatus 10 has the function indicated by the required function information, the main control portion 90 transmits the information about the installation position which has previously been stored in the storage portion 92, through the wireless communication portion 60 to the transmission source of the required function information.

The image processing apparatus 10 which has returned the information about the installation position turns on the lamp 101. For example, in the image processing apparatus 10, the MPU 91 of the main control portion 90 executes a lamp control program Pr12 stored in the storage portion 92. Thereby, the main control portion 90 turns on the lamp 101 when the image processing apparatus 10 has the function indicated by the required function information. It is also conceivable that the main control portion 90 blinks the lamp 101 in predetermined cycles.

In the present embodiment, the required function information transmitted from the CPU 61 also serves as a command that requests turn-on of the lamp 101 to the image processing apparatus 10 having the function indicated by the required function information.

The CPU 61 transmits the required function information through the wireless communication portion 64, and executes processes in step S103 and the subsequent steps described below, when receiving a response including the information about the installation position from the image processing apparatus 10.

That is, the CPU 61 executes the processes in step S103 and the subsequent steps, when the image processing apparatus 10 exists in an area in which the wireless communication via the wireless communication portion 64 can be performed. Although not illustrated in FIG. 4, if the image processing apparatus 10 does not exist in the area in which the wireless communication via the wireless communication portion 64 can be performed, the CPU 61 ends the target apparatus designating process.

<Step S103>

Next, the CPU 61 of the main calculation portion 6 obtains the position of the head-mounted device 1 which is detected by the GPS element 66, the azimuth at which the head-mounted device 1 faces, which is detected by the electronic compass 67, and the line-of-sight direction which is detected by the line-of-sight detection portion 3.

In the following description, the latest position of the head-mounted device 1, which is obtained from the GPS element 66, is referred to as "current position", and the latest azimuth at which the head-mounted device 1 faces, which is obtained from the electronic compass 67, is referred to as "current azimuth".

<Step S104>

Further, the CPU 61 determines whether or not an installation recognition condition that the image processing apparatus 10 exists at the azimuth of the line of sight of the user is satisfied. The installation position to be the target of the determination regarding the installation recognition condition in step S104 is the installation position obtained in step S102. The CPU 61 executing the process of step S104 is an example of an installation recognition portion.

The CPU 61 specifies the azimuth of the line of sight of the user on the basis of the current azimuth and the line-of-sight direction. Further, the CPU 61 specifies the azimuth at which the image processing apparatus 10 exists, on the basis of the current position and the installation position of the image processing apparatus 10.

<Step S105>

Figure 7:
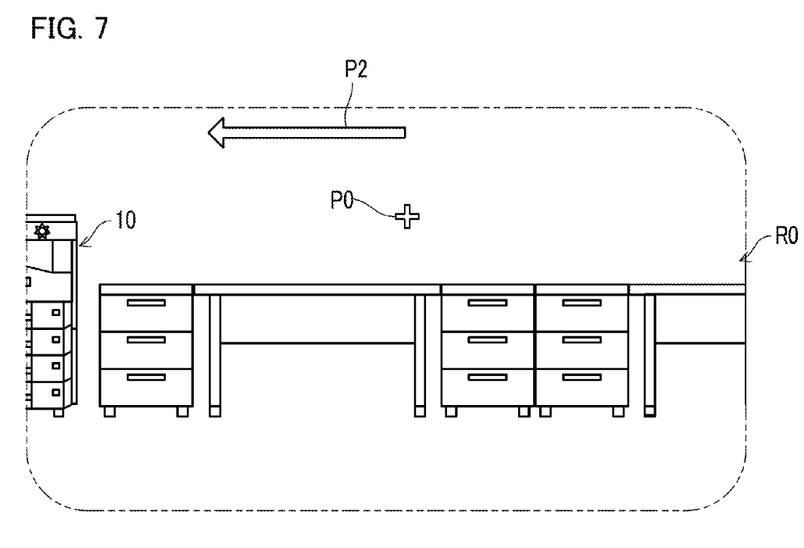
FIG. 7 is a diagram showing an example of an image of the field of view of the user, including a guide image projected by the head-mounted device according to the embodiment.

When the installation recognition condition is not satisfied, the CPU 61 of the main calculation portion 6 causes the image display portion 4 to display a guide image P2 which guides the line of sight of the user to the azimuth at which the image processing apparatus 10 exists (refer to FIG. 7). The CPU 61 executing the process in step S105 is an example of a line-of-sight guide portion.

The CPU 61 determines the direction of deviation of the azimuth of the image processing apparatus 10 from the azimuth of the line of sight of the user, and causes the image display portion 4 to display the guide image P2 indicating the direction of the deviation. The guide image P2 is superimposed on the actual image R0 and visually recognized by the user.

In the example shown in FIG. 7, the guide image P2 is an arrow mark representing the direction in which the image processing apparatus 10 exists. It is conceivable that the length of the arrow mark is changed according to the amount of deviation of the azimuth of the image processing apparatus 10 from the azimuth of the line of sight of the user.

The CPU 61 repeats the processes from step S103 after the process in step S105. It is also conceivable that the guide image P2 is an image of a character or a character string indicating the direction in which the image processing apparatus 10 exists.

<Step S106>

When the installation recognition condition is satisfied, the CPU 61 of the main calculation portion 6 determines whether or not the line-of-sight direction has entered the gaze state. The CPU 61 repeats the processes in steps S103 to S105 until the line-of-sight direction enters the gaze state.

<Step S107>

When the line-of-sight direction enters the gaze state with the installation recognition condition being satisfied, the CPU 61 causes the image processing portion 63 to execute an apparatus recognition process. The apparatus recognition process is a process of determining whether or not an apparatus image expressing the image processing apparatus 10 exists in the position corresponding to the line-of-sight direction in the field-of-view image.

Hereinafter, a condition that the apparatus image exists in the position corresponding to the line-of-sight direction in the field-of-view image, when the line-of-sight direction enters the gaze state under the situation that the image processing apparatus 10 exists in the area in which the wireless communication can be performed, is referred to as a first recognition condition.

The CPU 61 executing the process in step S107 is an example of a first apparatus recognition portion which determines whether or not the first recognition condition is satisfied.

Figure 8:
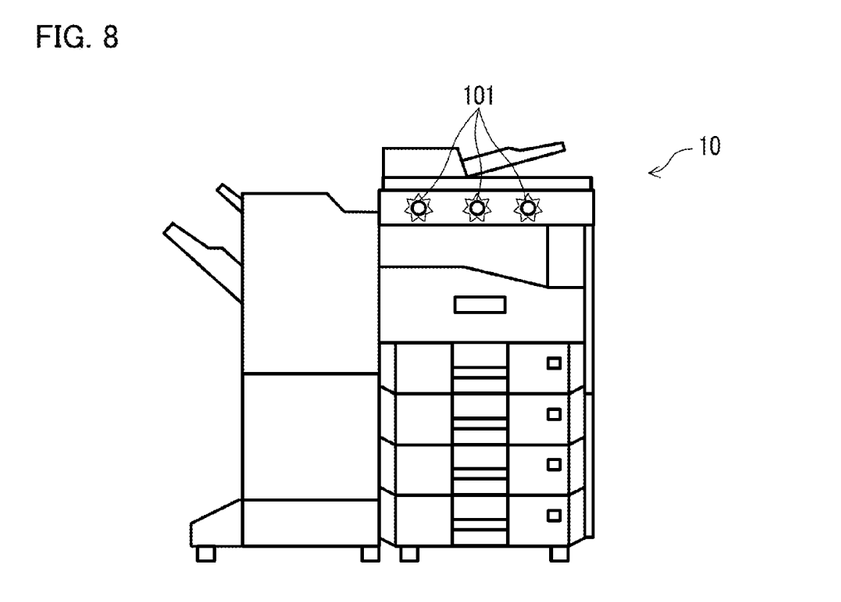
FIG. 8 is an external view of the image processing apparatus with a lamp being lit.

In the present embodiment, the image processing portion 63 recognizes, as the apparatus image, an image of the lamp 101 that lights in the image processing apparatus 10 which has received the required function information (refer to FIG. 8). The image processing of recognizing the image of the lamp 101 is easier and more reliable than the image processing of recognizing the image of the image processing apparatus 10 itself.

The image processing portion 63 detects, from the field-of-view image, a plurality of dot-shaped images which are brighter than or equal to a predetermined level, and recognizes the dot-shaped images as images of a plurality of lamps 101, that is, as the image of the image processing apparatus 10.

It is also conceivable that the luminescent color of the lamp 101 has been set in advance, and the image processing portion 63 identifies the luminescent color to distinguish the image of the lamp 101 from other images. Further, it is also conceivable that a dot-shaped image which is getting brighter in predetermined cycles is recognized as the image of the lamp 101.

The CPU 61 repeats the processes in steps S103 to S107 until the first recognition condition is satisfied.

In step S107, the image processing portion 63 performs determination regarding the first recognition condition when the installation recognition condition is satisfied. Thus, the execution frequency of the apparatus recognition process having a relatively high calculation load can be suppressed.

<Step S108>

When the first recognition condition is satisfied, the CPU 61 of the main calculation portion 6 specifies the target apparatus which is the image processing apparatus 10 existing at the azimuth of the line of sight of the user, which is specified based on the current azimuth and the line-of-sight direction.

The target apparatus is the image processing apparatus 10 for which the first recognition condition is satisfied. The communication address of the target apparatus in the wireless communication is the communication address of the transmission source of the information about the installation position for which the installation recognition condition is satisfied. The CPU 61 executing the process in step S108 is an example of a target apparatus specifying portion.

Figure 9:
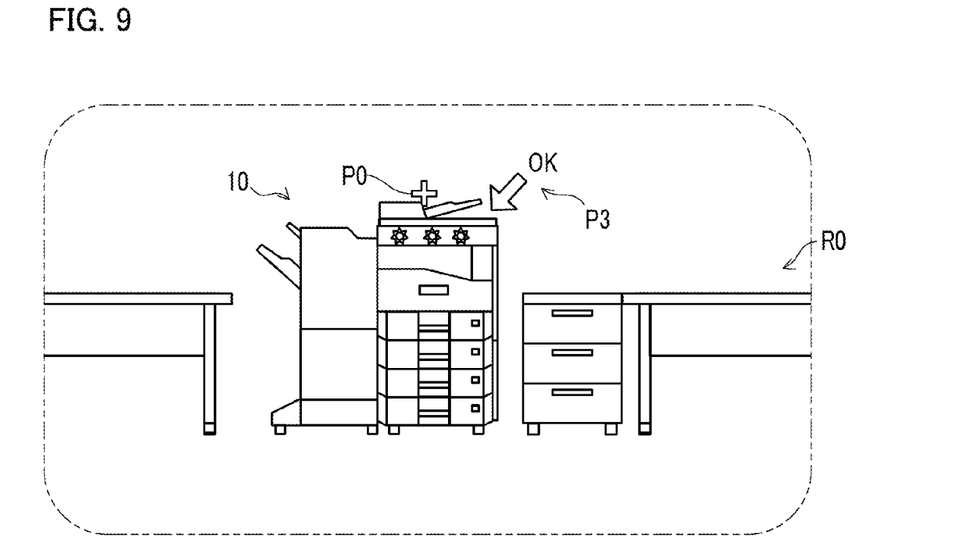
FIG. 9 is a diagram showing an example of an image of the field of view of the user, including apparatus recognition notification projected by the head-mounted device according to the embodiment.

Further, when the first recognition condition is satisfied, the CPU 61 causes the image display portion 4 to display an apparatus recognition notification P3 notifying that the image processing apparatus 10 is recognized (refer to FIG. 9). In the example shown in FIG. 9, the apparatus recognition notification P3 is a mark pointing at the image processing apparatus 10 for which the first recognition condition is satisfied. The CPU 61 executing the process in step S108 is an example of a target apparatus notification portion.

<Step S109>

When the target apparatus is specified, i.e., when the first recognition condition is satisfied, the CPU 61 transmits a start instruction to the target apparatus through wireless communication. The CPU 61 executing this process is an example of a start instruction portion.

If the image processing apparatus 10 is in a power-saving mode when receiving the start instruction, the image processing apparatus 10 is promptly restored to a normal mode where the image processing apparatus 10 can execute the job regarding image processing. In the power-saving mode, supply of power to some equipment such as a fixing heater is suspended.

The image processing apparatus 10 in the power-saving mode requires a relatively long time before start of the job regarding image processing. In the present embodiment, before the user arrives at the target apparatus, the start instruction is transmitted from the head-mounted device 1 to the target apparatus. Thus, when the user has arrived at the target apparatus, the target apparatus has been restored to the normal mode in which the target apparatus can promptly execute the job regarding image processing.

<Step S110>

Further, the CPU 61 executes an apparatus state notification process when the target apparatus is specified, i.e., when the first recognition condition is satisfied. The apparatus state notification process includes an apparatus state obtaining process and an apparatus state display process. The CPU 61 executing the process in step S110 is an example of an apparatus state notification portion.

The apparatus state obtaining process is a process of obtaining information indicating the state of the target apparatus, from the target apparatus through the wireless communication. When the target apparatus is in an error state such as a sheet material shortage state, a developer shortage state, or a sheet material jamming state, the CPU 61 obtains information about the error state from the target apparatus. The error state is an example of information indicating the state of the target apparatus.

The apparatus state display process is a process of causing the image display portion 4 to display the state of the target apparatus. In the present embodiment, before the user arrives at the target apparatus, the error state or the like of the target apparatus is displayed on the image display portion 4. Thus, the user can make preparations such as getting supplemental consumables before arriving at the target apparatus.

Thus, the target apparatus designating process is ended. When the target apparatus is specified by the target apparatus designating process, i.e., when the first recognition condition is satisfied, the CPU 61 executes the job instructing process after the target apparatus designating process. If the target apparatus is not specified, the job instructing process is not executed.

[Job Instructing Process]

Figure 5:
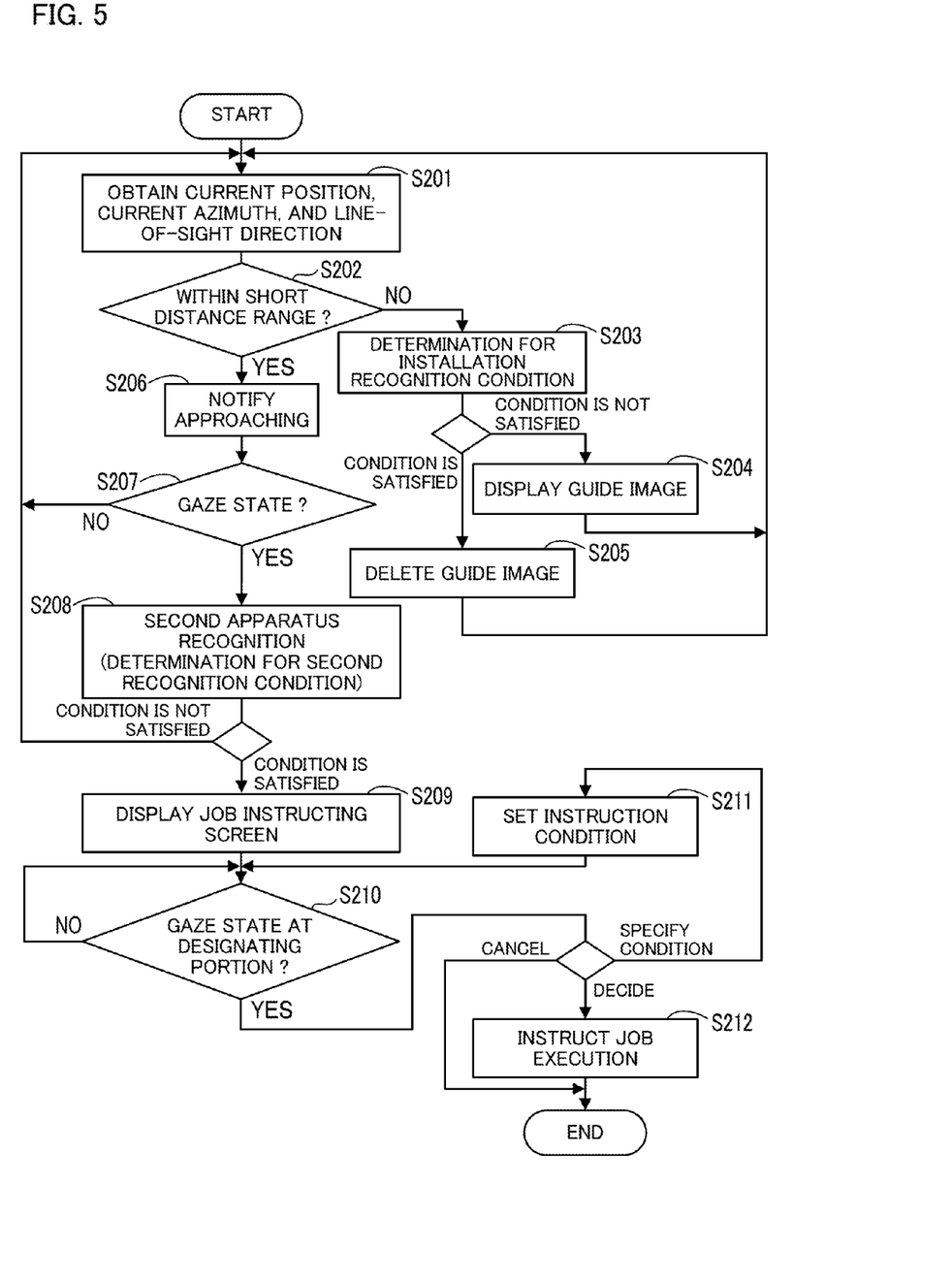
FIG. 5 is a flowchart showing an example of a job instructing process in the head-mounted device according to the embodiment.

Next, with reference to a flowchart shown in FIG. 5, an example of a procedure of the job instructing process in the head-mounted device 1 will be described.

In the following description, S201, S202, each represents an identification character of a step executed by the main calculation portion 6. When the CPU 61 executes a job instructing program Pr2 stored in the storage portion 62, the main calculation portion 6 executes the job instructing process.

<Step S201>

When the target apparatus is specified, the CPU 61 of the main calculation portion 6 obtains the current position, the current azimuth, and the line-of-sight direction, as in step S103.

<Step S202>

Next, the CPU 61 determines whether or not the current position is within a predetermined short distance range with respect to the position of the target apparatus. The short distance range is a very narrow range that allows the user to touch the target apparatus. The CPU 61 executing the process in step S202 is an example of a short distance determination portion.

<Step S203>

When the current position is not within the short distance range, the CPU 61, as in step S104, determines whether or not the installation recognition condition that the target apparatus exists at the azimuth of the line of sight of the user is satisfied.

<Step S204>

When the installation recognition condition is not satisfied, the CPU 61 of the main calculation portion 6 causes the image display portion 4 to display the guide image P2 which guides the line of sight of the user to the azimuth at which the image processing apparatus 10 exists (refer to FIG. 7).

<Step S205>

On the other hand, when the installation recognition condition is satisfied, the CPU 61 of the main calculation portion 6 deletes the guide image P2 displayed by the image display portion 4.

The CPU 61 repeats the processes in steps S201 to S205 until the current position enters the short distance range.

<Step S206>

When the current position enters the short distance range, the CPU 61 transmits a notification that the user approaches the target apparatus, to the target apparatus through the wireless communication. Upon receiving this notification, the target apparatus turns on the lamp 101.

<Step S207>

Further, the CPU 61 determines, as in step S106, whether or not the line-of-sight direction has entered the gaze state, in the state where the current position is within the short distance range. The CPU 61 repeats the processes in steps S201 to S206 until the line-of-sight direction enters the gaze state.

<Step S208>

When the line-of-sight direction enters the gaze state with the current position being within the short distance range, the CPU 61 causes the image processing portion 63 to execute the apparatus recognition process.

Hereinafter, a condition that the apparatus image exists in the position corresponding to the line-of-sight direction in the field-of-view image, when the line-of-sight direction enters the gaze state under the situation that the current position is within the short distance range with respect to the position of the target apparatus, is referred to as a second recognition condition.

The CPU 61 executing the process in step S208 is an example of a second apparatus recognition portion which determines whether or not the second recognition condition is satisfied.

For example, it is conceivable that the set gaze time in the determination for the gaze state in step S207 is shorter than the set gaze time in the determination for the gaze state in step S106. The process in step S106 is the determination process for the gaze state before the current position enters the short distance range. On the other hand, the process in step S207 is the determination process for the gaze state after the current position enters the short distance range.

That is, it is conceivable that the set gaze time in step S106 is set to a time longer than the set gaze time in step S207. Thus, an undesirable situation is avoided that, while the user looks around, the image processing apparatus 10 existing at the azimuth of the line of sight of the user happens to be recognized by the user as the target apparatus against the user's will.

<Step S209>

Figure 10:
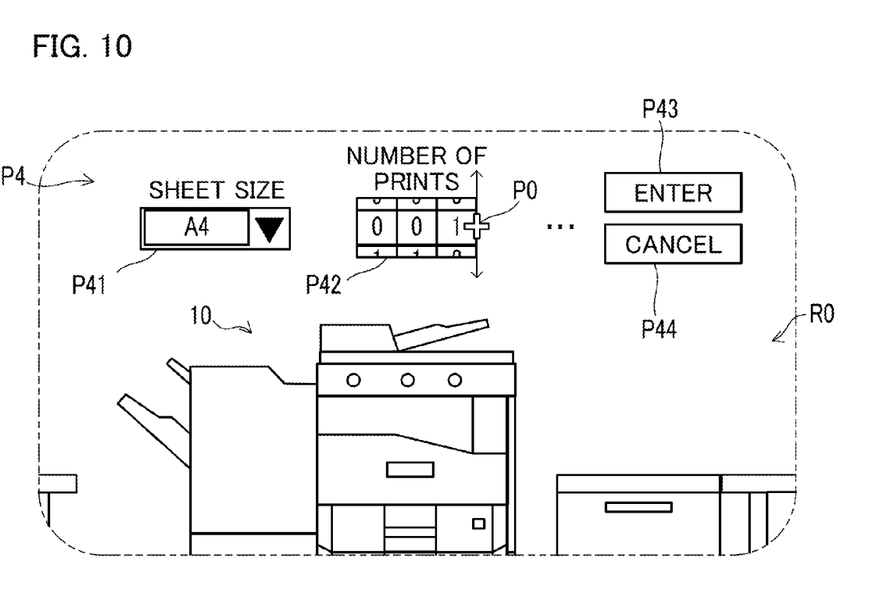
FIG. 10 is a diagram showing an example of an image of the field of view of the user, including an instruction screen projected by the head-mounted device according to the embodiment.

When the second recognition condition is satisfied, the CPU 61 of the main calculation portion 6 causes the image display portion 4 to display an instruction screen P4 as shown in FIG. 10, for example. The instruction screen P4 is a screen for instructing the target apparatus to execute the job regarding image processing. The CPU 61 sets the condition for the job to be executed by the target apparatus in accordance with the position of the line-of-sight direction on the instruction screen P4. The CPU 61 executing the process in step S209 is an example of an instruction screen control portion.

As shown in FIG. 10, the instruction screen P4 includes job condition designating portions such as a sheet size designating portion P41 and a number-of-prints designating portion P42. Further, the instruction screen P4 includes an "enter" designating portion P43, a "cancel" designating portion P44, and the like.

<Step S210>

When the instruction screen P4 is displayed, the CPU 61 determines whether or not the line-of-sight direction has entered the gaze state toward any of the designating portions such as the job condition designating portions P41 and P42, the "enter" designating portion P43, and the "cancel" designating portion P44.

<Step S211>

When the line-of-sight direction enters the gaze state toward the job condition designating portion P41, P42, the CPU 61 sets the condition for the job to be instructed to the target apparatus. Thereafter, the CPU 61 repeats the processes from step S210.

In the example shown in FIG. 10, the number-of-prints designating portion P42 is displayed as an image of a multiple-digit dial. After the line-of-sight direction has entered the gaze state toward the number of each digit of the dial, the CPU 61 counts up or counts down the number of the gazed digit every time the line-of-sight direction moves upward or downward from the position in the gaze state.

<Step S212>

When the line-of-sight direction enters the gaze state toward the "enter" designating portion P43, the CPU 61 transmits an instruction to execute the job including information designating the condition of the job, to the target apparatus through the wireless communication. Thus, the target apparatus executes the job regarding image processing in accordance with the designated condition.

When the line-of-sight direction enters the gaze state toward the position of the "cancel" designating portion P44, the CPU 61 repeats the processes from step S209.

The process in step S212 is a process of transmitting instruction information according to the position of the line-of-sight direction on the instruction screen P4, to the target apparatus through the wireless communication. The CPU 61 executing the process in step S212 is an example of a job instruction portion. In the present embodiment, the job condition designating information is an example of the instruction information.

As described above, when the user wants to use an image processing apparatus 10 located in a facility, such as a library, which is not related to the affiliation the user belongs to, the user has no idea about the location, functions, and the like of each of a plurality of image processing apparatuses 10 located within the communication area of the wireless communication.

Under such environment of use, the head-mounted device 1 notifies the presence of the target apparatus in the field of view of the user, which is the image processing apparatus 10 to be used by the user. Further, the head-mounted device 1 instructs the target apparatus to execute the job regarding image processing in accordance with the line of sight of the user approaching the target apparatus. Therefore, according to the present embodiment, even under the above-mentioned environment of use, the user is allowed to easily access the image processing apparatus 10 and instruct the image processing apparatus 10 to execute the job.

Further, the head-mounted device 1 transmits the information about the required function designated by the user, to each of the image processing apparatuses 10 in the communication area of the wireless communication (S101, S102). Further, the head-mounted device 1 regards, as the target of determination for the first recognition condition, only the image processing apparatus 10 which has responded that the image processing apparatus 10 has the required function (S103 to S107). Thus, the target apparatus according to the purpose of the user is specified.

In the present embodiment, the response that the image processing apparatus 10 has the required function is the return of the information about the installation position in step S102.

Further, in step S102, the head-mounted device 1 obtains the installation position information from each image processing apparatus 10 through the wireless communication. Thus, the head-mounted device 1 need not previously store the installation position information of each image processing apparatus 10 in the storage portion 62 or the like.

Applied Example

It is also conceivable that, in the head-mounted device 1, the CPU 61 of the main calculation portion 6 obtains the apparatus image expressing the appearance of the image processing apparatus 10 having the function indicated by the required function information, from the image processing apparatus 10 through the wireless communication.

For example, in step S102 of the target apparatus designating process shown in FIG. 4, it is conceivable that the CPU 61 of the main calculation portion 6 obtains the apparatus image from the image processing apparatus 10 having the function indicated by the required function information. In this case, the apparatus recognition process in step S107, S208 is a process of recognizing the apparatus image obtained from the field-of-view image in step S102.

Further, in the head-mounted device 1, it is also conceivable that the CPU 61 of the main calculation portion 6 downloads map information including information about the locations of the respective image processing apparatuses 10, from a server on the Internet through the wireless communication or another public circuit.

The information processing device and the method for instructing a job to the image processing apparatus according to the present disclosure can also be configured by freely combining the embodiments and the applied example described above, or by omitting a part of or modifying the embodiments and the applied example as appropriate, within the scope of the invention defined by claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing device wearable by a user of an image processing apparatus, comprising:
    a camera configured to take an image of a field of view of the user;
    an azimuth detection device configured to detect an azimuth at which the information processing device faces;
    a line-of-sight detection sensor configured to detect a line-of-sight direction of the user;
    an image display device configured to cause the user to visually recognize an image;
    a wireless communication device configured to perform wireless communication with another device;
    a self-device measurement device configured to measure a position of the information processing device; and
    a processor configured to execute:
        an installation position obtaining portion configured to obtain installation position information indicating a position of the image processing apparatus;
        a first apparatus recognition portion configured to determine whether or not a first recognition condition is satisfied, the first recognition condition being a condition that an apparatus image expressing the image processing apparatus exists in a position corresponding to the line-of-sight direction in a field-of-view image taken by the camera, in a case where the line-of-sight direction enters a predetermined gaze state under a situation that the image processing apparatus exists in an area where the wireless communication can be performed;
        a target apparatus notification portion configured to, in a case where the first recognition condition is satisfied, cause the image display device to display a notification notifying that a target apparatus is recognized which is the image processing apparatus existing at an azimuth of the line of sight of the user, which azimuth is specified based on the azimuth at which the information processing device faces and the line-of-sight direction;

a short distance determination portion configured to determine whether or not the position of the information processing device is within a short distance range which is previously determined with respect to the position of the target apparatus;

a second apparatus recognition portion configured to determine whether or not a second recognition condition is satisfied, the second recognition condition being a condition that the apparatus image exists in the position corresponding to the line-of-sight direction in the field-of-view image, in a case where the line-of-sight direction enters the gaze state under a situation that the position of the information processing device is within the short distance range with respect to the position of the target apparatus;

an instruction screen control portion configured to, in a case where the second recognition condition is satisfied, cause the image display device to display an instruction screen for instructing the target apparatus to execute a job regarding image processing; and a job instruction portion configured to transmit instruction information according to the position of the line-of-sight direction on the instruction screen, to the target apparatus through the wireless communication.

2. The information processing device according to claim 1, wherein the processor is further configured to execute an apparatus state notification portion configured to, when the first recognition condition is satisfied, obtain information indicating a state of the target apparatus from the target apparatus through the wireless communication, and cause the image display device to display the information indicating the state of the target apparatus.

3. The information processing device according to claim 1, wherein the processor is further configured to execute:

an installation recognition portion configured to determine whether or not an installation recognition condition is satisfied, the installation recognition condition being a condition that the image processing apparatus exists at the azimuth of the line of sight of the user, which azimuth is specified based on the azimuth at which the information processing device faces and the line-of-sight direction; and a line-of-sight guide portion configured to, when the installation recognition condition is not satisfied, cause the image display device to display a guide image which guides the line of sight of the user to the azimuth at which the image processing apparatus exists.

4. The information processing device according to claim 3, wherein the first apparatus recognition portion performs determination regarding the first recognition condition, in the case where the installation recognition condition is satisfied.

5. The information processing device according to claim 1, wherein the processor is further configured to execute a start instruction portion configured to, when the first recognition condition is satisfied, transmit start instruction to the target apparatus through the wireless communication.

6. The information processing device according to claim 1, wherein the processor is further configured to execute:

a function selection portion configured to cause the image display device to display a function selection screen for selecting a function required for execution of the job, and select the function required for execution of the job in accordance with the position corresponding to the line-of-sight direction on the function selection screen; and a required function information transmission portion configured to transmit required function information including information about a function required for execution of the selected job, to each image processing apparatus through the wireless communication, and the apparatus image is an image of a lamp which lights in the image processing apparatus which has received the required function information.

7. The information processing device according to claim 1, wherein the installation position obtaining portion obtains the installation position information from each image processing apparatus through the wireless communication.

8. A method for instructing a job to an image processing apparatus, using an information processing device including:

a camera configured to take an image of a field of view of a user of an image processing apparatus;

an azimuth detection device configured to detect an azimuth at which the information processing device faces;

a line-of-sight detection sensor configured to detect a line-of-sight direction of the user;

an image display device configured to cause the user to visually recognize an image;

a wireless communication device configured to perform wireless communication with another device; and a self-device measurement device configured to measure a position of the information processing device, the method comprising:

obtaining, by the information processing device, installation position information indicating a position of the image processing apparatus;

determining, by the information processing device, whether or not a first recognition condition is satisfied, the first recognition condition being a condition that an apparatus image expressing the image processing apparatus exists in a position corresponding to the line-of-sight direction in a field-of-view image taken by the camera, in a case where the line-of-sight direction enters a predetermined gaze state under a situation that the image processing apparatus exists in an area where the wireless communication can be performed;

causing, by the information processing device, the image display device to display a notification notifying that a target apparatus is recognized which is the image processing apparatus existing at an azimuth of the line of sight of the user, which azimuth is specified based on the azimuth at which the information processing device faces and the line-of-sight direction, in a case where the first recognition condition is satisfied;

determining, by the information processing device, whether or not the position of the information processing device is within a short distance range which has previously been determined with respect to the position of the target apparatus;

determining, by the information processing device, whether or not a second recognition condition is satisfied, the second recognition condition being a condition that the apparatus image exists in the position corresponding to the line-of-sight direction in the field-of-view image, in the case where the line-of-sight direction enters the gaze state under the situation that the position of the information processing device is within the short distance range with respect to the position of the target apparatus; and causing, by the information processing device, the image display device to display an instruction screen for instructing the target apparatus to execute a job regarding image processing, in a case where the second recognition condition is satisfied; and transmitting, by the information processing device, instruction information according to the position of the line-of-sight direction on the instruction screen, to the target apparatus through the wireless communication.

\* \* \* \* \*